United States Patent
Büscher

(10) Patent No.: US 12,162,584 B2
(45) Date of Patent: Dec. 10, 2024

(54) MOVABLE AERODYNAMIC SURFACE FOR AN AIRCRAFT

(71) Applicant: Airbus Operations GmbH, Hamburg (DE)

(72) Inventor: Alexander Büscher, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 277 days.

(21) Appl. No.: 17/701,192

(22) Filed: Mar. 22, 2022

(65) Prior Publication Data

US 2022/0306273 A1     Sep. 29, 2022

(30) Foreign Application Priority Data

Mar. 23, 2021   (DE) .................... 10 2021 107 280.8

(51) Int. Cl.
    *B64C 1/40*       (2006.01)
    *B64C 3/26*       (2006.01)
    (Continued)

(52) U.S. Cl.
    CPC .............. *B64C 1/40* (2013.01); *B64C 3/26* (2013.01); *B64C 7/00* (2013.01); *B64C 9/18* (2013.01);
    (Continued)

(58) Field of Classification Search
    CPC ......... B64C 3/187; B64C 21/02; B64C 21/10; B64C 2230/14; B64C 2230/22; B64C 2230/24
    See application file for complete search history.

(56) References Cited

U.S. PATENT DOCUMENTS 9,199,721 B2 * 12/2015 Cook ...................... B64C 9/18
9,227,719 B2 * 1/2016 Khorrami ............... B64C 21/10
(Continued)

FOREIGN PATENT DOCUMENTS

DE    10 2016 123 096      5/2018
EP         3 233 626      10/2017
(Continued)

OTHER PUBLICATIONS

German Search Report for DE Application No. 10 2021 107 280.8, dated Nov. 9, 2021, 6 pages.
(Continued)

*Primary Examiner* — Richard Green
(74) *Attorney, Agent, or Firm* — Nixon & Vanderhye P.C.

(57) ABSTRACT

A movable aerodynamic surface for an aircraft is disclosed including a skin having a first skin portion and a second skin portion both extending from the leading edge to the trailing edge and together surrounding an interior from opposite sides, and a stiffener arrangement arranged in the interior and including at least an inboard stiffener in the area of the inboard end and/or an outboard stiffener in the area of the outboard end. At the inboard end between the first skin portion, the second skin portion and the inboard stiffener an inboard cavity is formed, and/or at the outboard end between the first skin portion, the second skin portion and the outboard stiffener an outboard cavity is formed. An acoustic filler arrangement including multiple filler elements is arranged within the inboard cavity and/or the outboard cavity for reducing noise.

17 Claims, 4 Drawing Sheets

(51) Int. Cl.
*B64C 7/00* (2006.01)
*B64C 9/18* (2006.01)

(52) U.S. Cl.
CPC ...... *B64C 2230/14* (2013.01); *B64C 2230/22* (2013.01)

(56) References Cited

U.S. PATENT DOCUMENTS

| | | |
|---|---|---|
| 10,501,165 B2* | 12/2019 | Wong ..................... B64C 21/02 |
| 2011/0133025 A1 | 6/2011 | Vauchel et al. |
| 2012/0318924 A1 | 12/2012 | Porte et al. |
| 2014/0209737 A1 | 7/2014 | Cook et al. |
| 2015/0259060 A1 | 9/2015 | Khorrami |
| 2018/0148163 A1* | 5/2018 | Bauer ..................... B64C 21/02 |
| 2020/0070951 A1* | 3/2020 | Machunze .............. B64C 3/187 |
| 2020/0298953 A1* | 9/2020 | Roggeveen ............. B64C 21/10 |

FOREIGN PATENT DOCUMENTS

| | | |
|---|---|---|
| EP | 3 694 776 | 8/2020 |
| WO | 2016/097939 | 6/2016 |
| WO | 2019/072980 | 4/2019 |

OTHER PUBLICATIONS

Extended European Search Report for Application No. EP 22163395.1, seven pages, dated Aug. 1, 2022.

\* cited by examiner

MOVABLE AERODYNAMIC SURFACE FOR AN AIRCRAFT

CROSS REFERENCE TO RELATED APPLICATION

This application claims priority to and incorporates by reference German Application Number DE 10 2021 107 280.8, filed Mar. 23, 2021.

BACKGROUND

1. Field of the Invention

The present invention relates to a movable aerodynamic surface for an aircraft, configured for noise reduction, in particular a high lift surface, such as a flap or a slat, or a control surface, such as an aileron, a rudder or an elevator. Further aspects of the invention relate to a wing comprising such an aerodynamic surface, and to an aircraft comprising such an aerodynamic surface and/or such a wing.

2. Description of Related Art

The aerodynamic surface comprises a skin, a stiffener arrangement, and an acoustic filler arrangement. The skin extends in a span direction from an inboard end to an outboard end and extends in a chord direction from a leading edge to a trailing edge. The skin includes a first skin portion, preferably an upper skin portion, and a second skin portion, preferably a lower skin portion. Both first and second skin portions extend from the leading edge to the trailing edge and together surround an interior of the aerodynamic surface from opposite sides.

The stiffener arrangement arranged is in the interior for stiffening the first and second skin portions and includes at least an inboard stiffener in the area of the inboard end and/or an outboard stiffener in the area of the outboard end. Preferably, both the inboard stiffener and the outboard stiffener extend in the chord direction, preferably in a chord plane. At the inboard end between the first skin portion, the second skin portion and the inboard stiffener an inboard cavity is formed. Additionally or alternatively, at the outboard end between the first skin portion, the second skin portion and the outboard stiffener an outboard cavity is formed.

The acoustic filler arrangement includes multiple filler elements and is arranged or received within the inboard cavity and/or within the outboard cavity for reducing noise generated at the inboard cavity and/or at the outboard cavity. The noise is usually generated by sharp lateral edges of the first and second skin portions upstream from the inboard and/or outboard cavity which cause vortices that in turn are responsible for an undesired broadband noise. Additionally, the noise is generated by resonance within the inboard and/or outboard cavity which acts as a Helmholtz resonator that may cause undesired tonal and broadband noise.

Similar aerodynamic surfaces are known in the art, such as flaps, where various attempts have been made in the art to fill the cavities at the flap side edges in order to reduce unpleasant noise. In one attempt the cavities have been filled by solid filler elements with a smooth outer surface. Such filler elements were able to reduce resonance within the cavities and the resulting noise. However, partial broadband noise still remained as the sharp lateral edges of the first and second skin portions upstream the cavities were still present. Thus, in another attempt the cavities have been filled by foam filler elements with a porous outer surface. Such filler elements were able to reduce also the broadband noise by the sharp lateral edges being softened by the porous edges of the filler elements. However, the foam filler elements are difficult to produce, install and maintain at a small scale or complex shape, such as in the area of the leading edge or the trailing edge of the aerodynamic surface.

SUMMARY

An aerodynamic surface enabling both efficient noise reduction and convenient and cost-efficient handling.

The acoustic filler arrangement has a hybrid form including at least one first type filler element with a smooth, non-porous outer surface and at least one second type filler element with a porous outer surface. In this connection the term "outer surface" relates to at least the lateral surface of the filler elements facing out of the inboard cavity and/or out of the outboard cavity, i.e. the surface transverse or perpendicular to the span direction and facing laterally away from the interior of the aerodynamic surface. The term "outer surface" might also relate to the entire outer surface of the first and/or second type filler elements. Such a hybrid acoustic filler arrangement combines the advantages of both types of filler elements, i.e. of the smooth outer surface and the porous outer surface. The parts of the cavities that are sufficiently large and simple shaped are filled with the second type filler elements to achieve sufficient reduction of tonal and broadband noise, while the smaller and more complex shaped parts of the cavities are filled with the first type filler elements to allow cost-efficient production, installation and maintenance as well as convenient handling of the related filler elements. This allows that all noise due to resonance and most of the noise due to vortices can be widely reduced, while costs and effort are kept at a reasonable level.

According to an exemplary embodiment, the acoustic filler arrangement includes one or more further first type filler elements and/or second type filler elements. In such a way, different parts of the cavities can be filled with different types of filler elements.

According to an exemplary embodiment, the acoustic filler arrangement is arranged in the inboard cavity and/or in the outboard cavity in such a way that the entire inboard cavity and/or outboard cavity is filled, i.e. all parts of the inboard cavity and/or outboard cavity are filled. This leads to efficient reduction of the resonance noise.

According to an exemplary embodiment, the acoustic filler arrangement is arranged in the inboard cavity and/or in the outboard cavity in such a way that the outer surfaces, in particular the lateral surfaces facing out of the inboard cavity and/or out of the outboard cavity, of the first and second type filler elements extend in the same plane, which is preferably the same plane in which at least some of the lateral edges of the first and second skin portions extend and which may extend transversely or perpendicularly to the span direction. In such a way, the inboard cavity and/or the outboard cavity may be fully and continuously filled with the filler elements which form a continuous and smooth common lateral surface, preferably together with the lateral edges. This further improves noise reduction.

According to an exemplary embodiment, at the inboard end and/or at the outboard end, i.e. at the lateral edges, the first skin portion and/or the second skin portion has at least one cut-out, i.e. a recess, in the area of the second type filler element, preferably in a central area of the inboard and/or outboard cavity. I.e., the lateral edge of the first and/or second skin portion does not extend in the same plane as the porous outer surface of the second type filler element but instead is recessed or setback in the span direction relative to the porous outer surface of the second type filler element. In such a way, there are no sharp lateral edges present in the area of the cut-out, but rather porous lateral edges of the second type filler element, which largely reduce vortices and thus broadband noise. The cut-outs may have a depth, i.e. a span extension, of between 50% and 100%, may be between 70% and 95%, or may be about 90%, of the maximum profile thickness of the aerodynamic surface. The cut-outs might not extend along the entire chord extension of the second type filler element, so that there is a non-cut out area at both chord ends of the second type filler element for a better hold of the second type filler element. The cut-outs might have edges extending in chord direction and parallelly spaced from the lateral surface.

According to an exemplary embodiment, the first type filler element is formed, may be entirely formed, of a non-porous, solid material, which may be lightweight and resistant, such as plastic or metal, or aluminium, titanium or polymeric resin, which might or might not have a hollow inside. This relates to a very simple and efficient design. The first type filler element and/or the second type filler element can be fixed in the inboard cavity and/or in the outboard cavity by adhesive and/or by mechanical retainers, such as bolts.

According to an exemplary embodiment, the second type filler element is formed, may be entirely formed, of a porous material, which may be of a foam material. This relates to a very simple and efficient design.

In particular, the porous material may be an acoustic noise reduction foam, such as a metal foam or a plastic foam. This material allows efficient noise reduction.

According to an exemplary embodiment, the inboard cavity and/or the outboard cavity is divided in multiple cavity sections separated from one another by one or more cavity walls. Such cavity walls are provided e.g. for stiffening or as a guide rail for receiving a guide roller, such as a so-called fish mouth of a flap.

In particular, each cavity section may be filled with at least one first type filler element and/or second type filler element. Thus, no cavity section remains unfilled which improved noise reduction.

At least one cavity may be filled with both at least one first type filler element and at least one second type filler element. Thus, two different type filler elements are arranged in one common cavity section, which might be required, e.g., near edges or corners.

According to an exemplary embodiment, at least one, or maybe two, first type filler elements are arranged in the cavity in the area of the leading edge. At least one second type filler element is arranged in the cavity in a central area. At least one first type filler element is arranged in the cavity in the area of the trailing edge. In such a way, the small and complex shapes at the leading edge and the trailing edge are filled with the more convenient first type filler elements, while the central area can be filled with the more complex porous second type filler element. This relates to a very simple design and effective noise reduction.

The cavity may comprise at least one front cavity section in the area of the leading edge and a rear cavity section in the area of the trailing edge and preferably also in a central area. Two front cavity sections may be arranged in the area of the leading edge, may be on opposite sides of a guide rail for receiving a guide roller, such as a so-called fish mouth of a flap. The at least one front cavity section, preferably each of the two front cavity sections, is filled with at least one first type filler element. The rear cavity section is filled with at least one first type filler element arranged in the area of the trailing edge and preferably having a wedge shape, and at least one second type filler element arranged upstream from the at least one first type filler element arranged in the area of the trailing edge. In such a way, the second type filler element is arranged between at least two first type filler elements arranged at the leading edge and the trailing edge. This relates to a very simple design and effective noise reduction.

According to an exemplary embodiment, the aerodynamic surface is formed as a high lift flap, i.e., a trailing edge flap, movably mounted to the trailing edge of a wing for an aircraft. Alternatively, the aerodynamic surface might be formed as another high lift surface, such as a slat, or as a control surface, such as an aileron, a rudder or an elevator. Reducing the noise originating from the flap side edges largely reduces the overall noise during take-off and approach of an aircraft.

A further aspect of the invention relates to a wing for an aircraft comprising the aerodynamic surface according to any of the afore-described embodiments. Alternatively, the aerodynamic surface might be part of the vertical tail plane or the horizontal tail plane. The features and effects described above in connection with the aerodynamic surface apply vis-à-vis also to the wing.

A further aspect of the invention relates to an aircraft comprising the aerodynamic surface according to any of the afore-described embodiments, and/or comprising the wing according to any of the afore-described embodiments. The features and effects described above in connection with the aerodynamic surface and the wing apply vis-à-vis also to the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
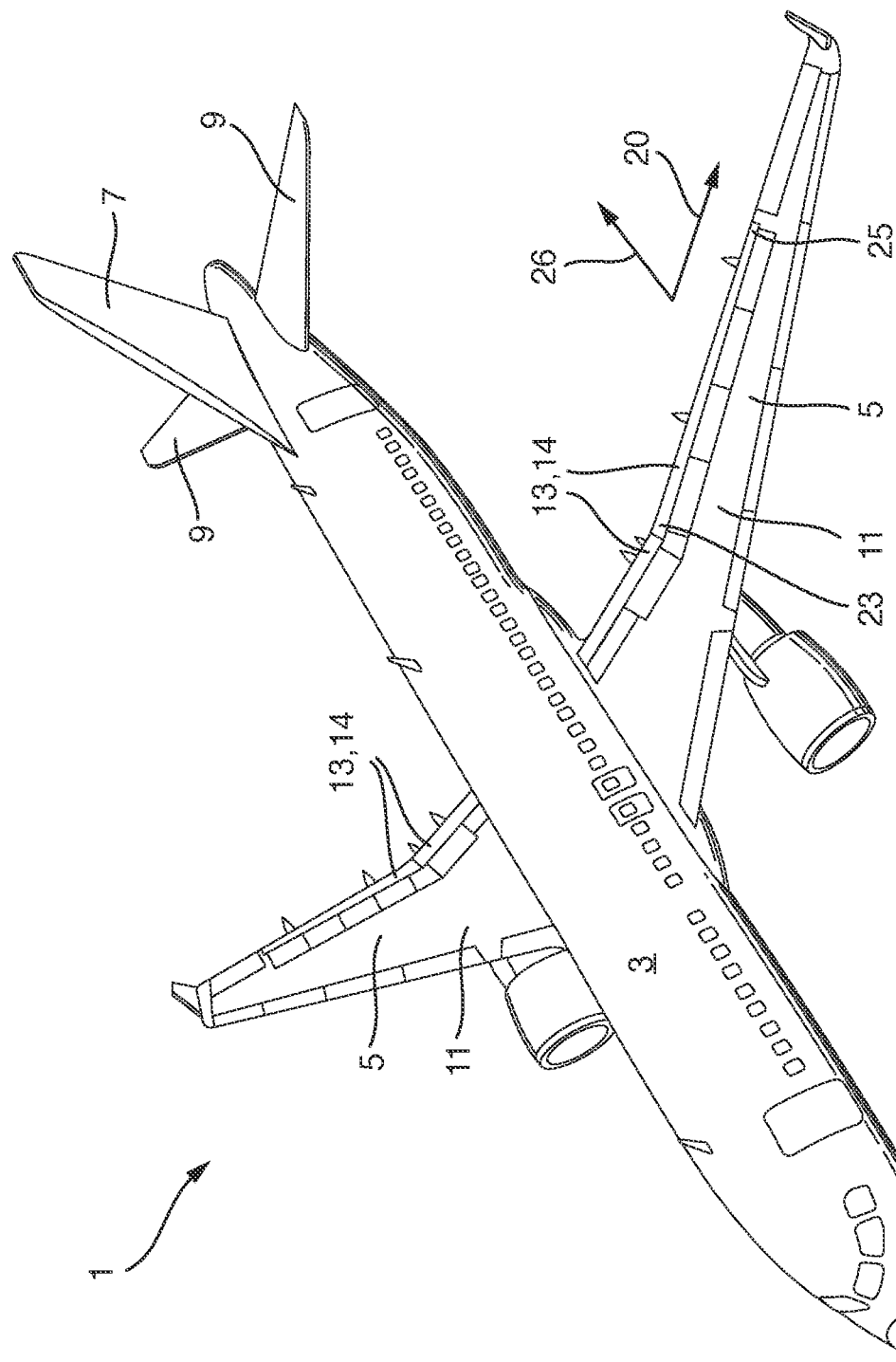
FIG. 1 a perspective view of an aircraft according to an embodiment of the invention.

In FIG. 1 an aircraft 1 according to the invention is illustrated. The aircraft 1 has a fuselage 3, wings 5, a vertical tail plane 7 and a horizontal tail plane 9. Each wing 5 comprises a main wing ii and at least one movable aerodynamic surface 13 in the form of a high lift flap 14 mounted to the trailing edge of the main wing 5 movably between a retracted position and an extended position.

Figure 2:
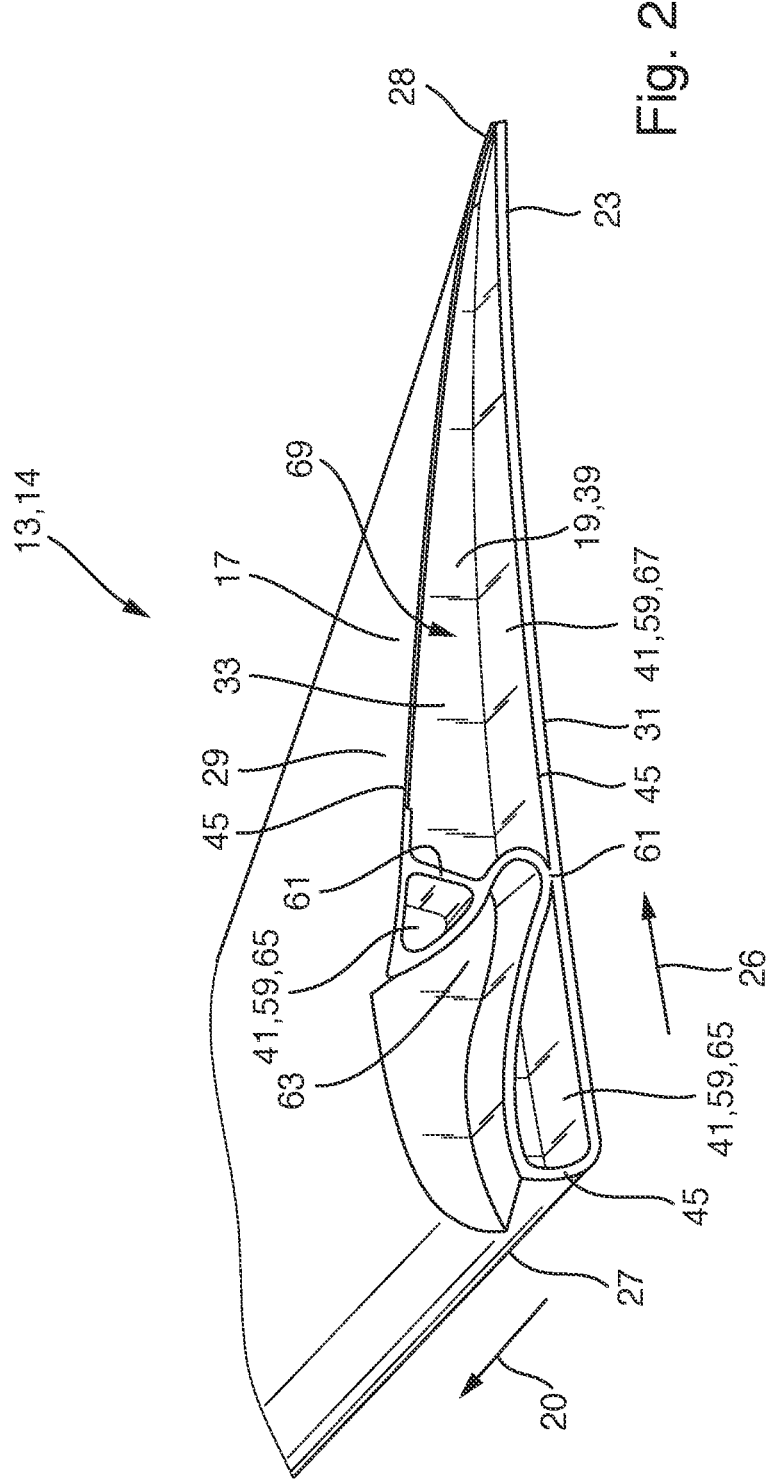
FIG. 2 a perspective view of an aerodynamic surface in the form of a high lift flap of the aircraft shown in FIG. 1, with an unfilled cavity.

As shown in FIG. 2, the aerodynamic surface 13 comprises a skin 17, a stiffener arrangement 19, and an acoustic filler arrangement 21. The skin 17 extends in a span direction 20 from an inboard end 23 to an outboard end 25 and extends in a chord direction 26 from a leading edge 27 to a trailing edge 28. The skin 17 includes an upper, first skin portion 29 and a lower, second skin portion 31. Both first and second skin portions 29, 31 extend from the leading edge 27 to the trailing edge 28 and together surround an interior 33 of the aerodynamic surface 13 from opposite upper and lower sides.

The stiffener arrangement 19 arranged is in the interior 33 for stiffening the first and second skin portions 29, 31 and includes an inboard stiffener 39 in the area of the inboard end 23 and an outboard stiffener (not shown) in the area of the outboard end 25. Both the inboard stiffener 39 and the outboard stiffener extend in the chord direction 26. However, only the inboard end 23 is shown in the Figures, so that the invention is described hereinafter only with reference to the inboard end 23, although the outboard end 25 might be formed in the same way as the inboard end 23. At the inboard end 23 between the first skin portion 29, the second skin portion 31 and the inboard stiffener 39 an inboard cavity 41 is formed.

The acoustic filler arrangement 21 includes multiple filler elements 43 and is arranged within the inboard cavity 41 for reducing noise generated at the inboard cavity 41. The noise is usually generated by sharp lateral edges 45 of the first and second skin portions 29, 31 upstream from the inboard cavity 41 which cause vortices that in turn are responsible for an undesired broadband noise. Additionally, the noise is generated by resonance within the inboard cavity 41 which acts as a Helmholtz resonator that may cause undesired tonal and broadband noise.

Figure 3:
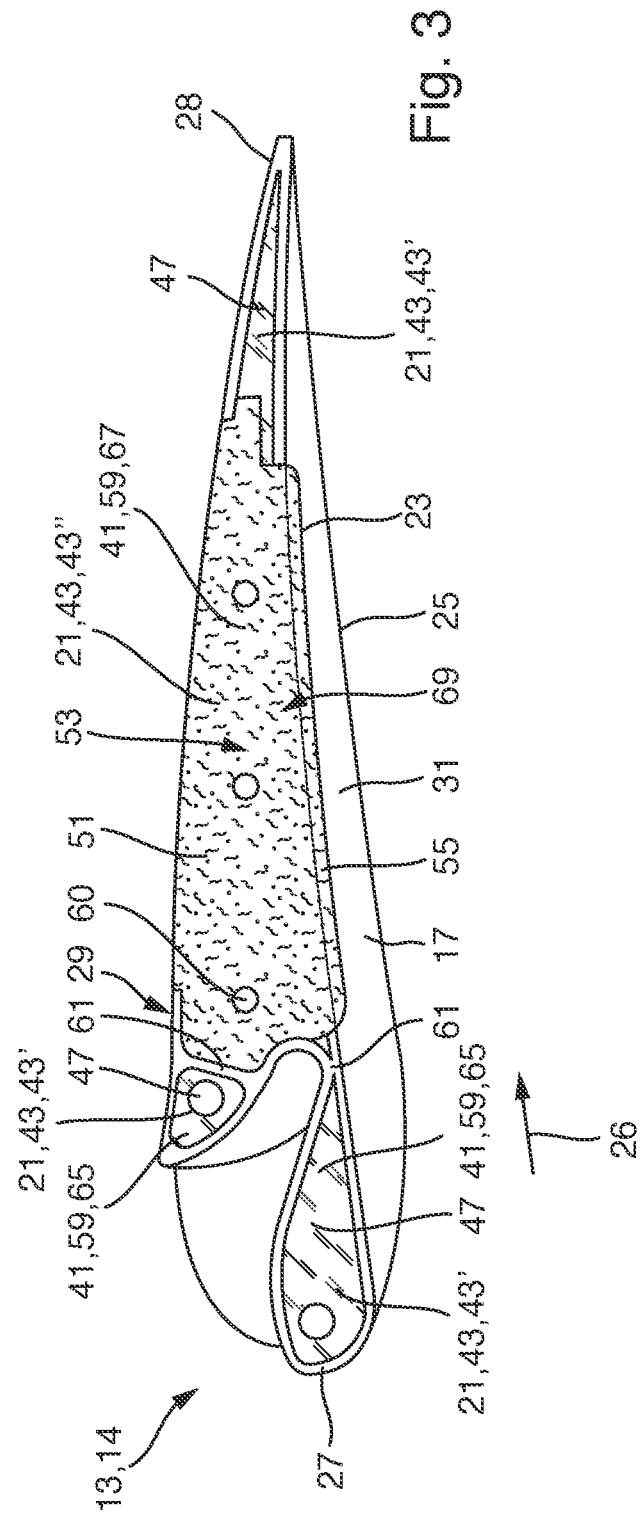
FIG. 3 a cross-sectional view of the high lift flap similar as the one shown in FIG. 2 having a cavity filled with a hybrid acoustic filler arrangement according to the invention.

As shown in FIG. 3, the acoustic filler arrangement 21 has a hybrid form including three first type filler elements 43' with a non-porous, smooth outer surface 47 and one second type filler element 43" with a porous outer surface 51.

The acoustic filler arrangement 21 is arranged in the inboard cavity 41 in such a way that the entire inboard cavity 41 is filled, i.e. all parts of the inboard cavity 41 are filled. The acoustic filler arrangement 21 is arranged in the inboard cavity 41 in such a way that the smooth outer surfaces 47 of the first type filler elements 43', in particular the lateral surfaces 53 facing out of the inboard cavity 41, extend in the same plane as the lateral edges 45 of the first and second skin portions 29, 31. In such a way, the inboard cavity 41 is fully and continuously filled with the filler elements 43 which form a continuous and smooth common lateral surface 53 together with the lateral edges 45 in the area of the first type filler elements 43'. However, cut-outs 55 are provided in the first and second skin portions 29, 31 in the area of the second type filler element 43", which will be described in more detail further below.

The first type filler element 43' is entirely formed of a non-porous, solid material, in the present embodiment aluminium, which has a hollow inside. The second type filler element 43" is entirely formed of a porous material in the form of an acoustic noise reduction foam, in the present embodiment a metal foam. Both first and second type filler elements 43', 43" are fixed in the inboard cavity 41 by bolts 60.

The inboard cavity 41 is divided in multiple cavity sections 59 separated from one another by several cavity walls 61. Each cavity section 59 is filled with at least one first type filler element 43' or second type filler element 43". One cavity section 59 is filled with both one first type filler element 43' and one second type filler element 43".

As shown in FIG. 3, the inboard cavity 41 comprises two front cavity sections 65 in the area of the leading edge 27 which are arranged on opposite sides of a so-called fish mouth 63 of the flap 14, which refers to a guide rail for receiving a main wing based guide roller for guiding the aerodynamic surface 13 during extension or retraction movement. The inboard cavity 41 further comprises a rear cavity section 67 extending in the area of the trailing edge 28 and also in a central area 69. Each of the two front cavity sections 65 is filled with one first type filler element 43'. The rear cavity section 67 is filled with one first type filler element 43' arranged in the area of the trailing edge 28 and having a wedged shape, and one second type filler element 43" arranged upstream from the trailing edge 28 and the related first type filler element 43'. In such a way, the second type filler element 43" is arranged in a central area 69 between at least two first type filler elements 43' arranged at the leading edge 27 and the trailing edge 28.

Figure 4:
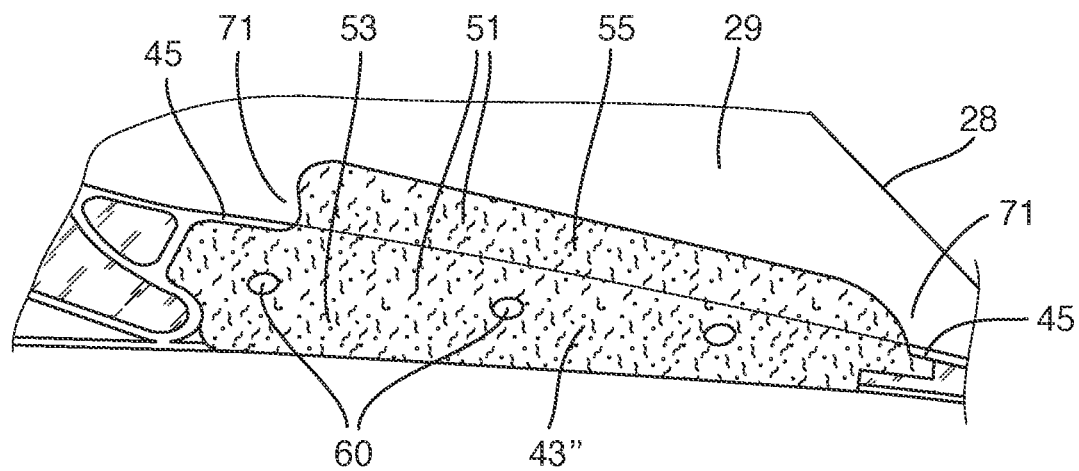
FIG. 4 a perspective view from above of the high lift flap of FIG. 3 showing the cut-out in the first skin portion; and, FIG. 5 a perspective view from below of the high lift flap of FIG. 3 showing the cut-out in the second skin portion.
Figure 5:
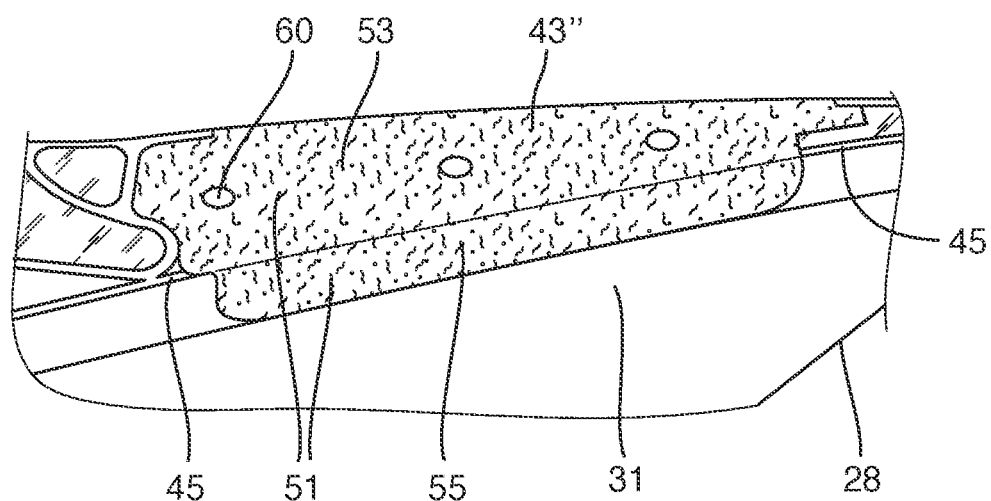

As shown in FIGS. 4 and 5, cut-outs 55 are formed in the first and second skin portions 29, 31 in the area of the second type filler element 43", i.e. in area of the rear cavity section 67 in the central area 69 of the inboard cavity 41. Specifically, the lateral edge 45 of the first skin portion 29 has a cut-out 55 in the area of the second type filler element 43", as shown in FIG. 4, and the lateral edge 45 of the second skin portion 31 has a cut-out 55 in the area of the second type filler element 43", as shown in FIG. 5. This means, the lateral edges 45 of the first and second skin portions 29, 31 do not extend in the same plane as the porous outer surface 51 of the second type filler element 43" and, thus, of the lateral surface 53, but instead are recessed in the span direction 20 relative to the porous outer surface 51 of the second type filler element 43", so that there are no sharp lateral edges 45 present in the area of the cut-out 55, but rather porous lateral edges of the second type filler element 43", which largely reduce vortices and thus broadband noise. The cut-outs have a depth, i.e. a span extension, of about 90% of the maximum profile thickness of the aerodynamic surface 13. The cut-outs 55 in the present embodiment do not extend along the entire chord extension of the second type filler element 43", so that there is a non-cut out area 71 at both chord ends of the second type filler element 43" for a better hold of the second type filler element 43". The cut-outs 55 in the present embodiment have edges extending in chord direction 26 and parallelly spaced from the lateral surface 53.

Although not shown in the Figures, the outboard end 25 of the aerodynamic surface 13 might be formed in the same way as the inboard end 23, including an outboard cavity (not shown) formed similar as the inboard cavity 41 and filled with an acoustic filler arrangement 21 as described above in connection with the inboard cavity 41.

Such an aerodynamic surface 13 comprising a hybrid acoustic filler arrangement 21 combines the advantages of both first and second type filler elements 43', 43", i.e. of the smooth outer surface 47 and the porous outer surface 51. The parts of the inboard cavity 41 that are sufficiently large and simple shaped are filled with the second type filler elements 43" to achieve sufficient reduction of tonal and broadband noise, while the smaller and more complex shaped parts of the cavities 41 are filled with the first type filler elements 43' to allow cost-efficient production, installation and maintenance as well as convenient handling of the related filler elements 43. This allows that all noise due to resonance and most of the noise due to vortices can be widely reduced, while costs and effort are kept at a reasonable level.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A movable aerodynamic surface for an aircraft, comprising a skin extending in a span direction from an inboard end to an outboard end and extending in a chord direction from a leading edge to a trailing edge, wherein the skin includes a first skin portion and a second skin portion both extending from the leading edge to the trailing edge and together surrounding an interior from opposite sides, and
 a stiffener arrangement arranged in the interior for stiffening the first and second skin portions and including at least an inboard stiffener in the area of the inboard end and/or an outboard stiffener in the area of the outboard end,
 wherein at the inboard end between the first skin portion, the second skin portion and the inboard stiffener an inboard cavity is formed, and/or at the outboard end between the first skin portion, the second skin portion and the outboard stiffener an outboard cavity is formed,
 wherein an acoustic filler arrangement including multiple filler elements is arranged within the inboard cavity and/or the outboard cavity for reducing noise generated at the inboard cavity and/or at the outboard cavity,
 wherein the acoustic filler arrangement has a hybrid form including at least one first type filler element with a smooth outer surface and at least one second type filler element with a porous outer surface,
 wherein the inboard cavity and/or the outboard cavity further comprises two front cavities in the area of the leading edge, wherein the two front cavities are disposed on the opposite sides of a guide rail.

2. The aerodynamic surface according to claim 1, wherein the acoustic filler arrangement includes one or more further first type filler elements and/or second type filler elements.

3. The aerodynamic surface according to claim 1, wherein the acoustic filler arrangement is arranged in the inboard cavity and/or in the outboard cavity in such a way that the entire inboard cavity and/or outboard cavity is filled.

4. The aerodynamic surface according to claim 1, wherein the acoustic filler arrangement is arranged in the inboard cavity and/or in the outboard cavity in such a way that the outer surfaces of the filler elements extend in the same plane as at least some of the lateral edges of the first and second skin portions.

5. The aerodynamic surface according to claim 1, wherein at the inboard end and/or at the outboard end the first skin portion and/or the second skin portion has at least one cut-out in the area of the second type filler element.

6. The aerodynamic surface according to claim 1, wherein the first type filler element is formed of a non-porous, solid material.

7. The aerodynamic surface according to claim 1, wherein the second filler element is formed of a porous material.

8. The aerodynamic surface according to claim 7, wherein the porous material is an acoustic noise reduction foam.

9. The aerodynamic surface according to claim 1, wherein the two front cavities are separated from one another by one or more cavity walls.

10. The aerodynamic surface according to claim 9, wherein each of the two front cavities is filled with at least one first type filler element and/or second type filler element.

11. The aerodynamic surface according to claim 9, wherein at least one front cavity of the two front cavities is filled with both at least one first type filler element and at least one second type filler element.

12. The aerodynamic surface according to claim 9, wherein the inboard cavity and/or the outboard cavity comprises a rear cavity in the area of the trailing edge,
 wherein the two front cavities are filled with at least one first type filler element,
 wherein the rear cavity is filled with at least one second type filler element arranged in the area of the trailing edge and at least one second type filler element arranged upstream from the at least one first type filler element.

13. The aerodynamic surface according to claim 1, wherein at least one first type filler element is arranged in the inboard cavity and/or in the outboard cavity in the area of the leading edge,
 wherein at least one second type filler element is arranged in the inboard cavity and/or in the outboard cavity in a central area, and
 wherein at least one first type filler element is arranged in the inboard cavity and/or in the outboard cavity in the area of the trailing edge.

14. The aerodynamic surface according to claim 1, wherein the aerodynamic surface is formed as a high lift flap.

15. A wing for an aircraft comprising the aerodynamic surface according to claim 1.

16. An aircraft comprising the wing according to claim 15.

17. An aircraft comprising the aerodynamic surface according to claim 1.

* * * * *